United States Patent [19]

Fare'

[11] Patent Number: 4,991,984
[45] Date of Patent: Feb. 12, 1991

[54] BELT TENSIONING MEANS FOR A SERIAL PRINTER

[75] Inventor: Carlo Fare', Limito, Italy

[73] Assignee: Bull HN Information Systems Inc., Billerica, Mass.

[21] Appl. No.: 364,050

[22] Filed: Jun. 8, 1989

[30] Foreign Application Priority Data

Jul. 7, 1988 [IT] Italy ................... 21262 A/88

[51] Int. Cl.⁵ .............................. B41J 19/56
[52] U.S. Cl. ...................... 400/335; 400/320; 474/117
[58] Field of Search ........... 400/320, 335; 474/101, 474/113, 117; 267/30, 152

[56] References Cited

U.S. PATENT DOCUMENTS

| | | | |
|---|---|---|---|
| 4,395,151 | 7/1983 | Krenz | 400/320 |
| 4,484,485 | 11/1984 | Matsuhisa | 400/322 |
| 4,631,734 | 1/1972 | Wagner | 74/242.11 R |
| 4,653,948 | 3/1987 | Ikeda | 400/335 |
| 4,678,354 | 7/1987 | Olsen | 400/335 |
| 4,746,237 | 5/1988 | Takeda | 400/335 |
| 4,796,910 | 1/1989 | Starr, Sr. | 267/30 |

FOREIGN PATENT DOCUMENTS

| | | |
|---|---|---|
| 3537240 | 4/1987 | Fed. Rep. of Germany . |
| 2104394 | 4/1972 | France . |
| 179380 | 10/1984 | Japan ........ 400/320 |
| 255880 | 11/1986 | Japan ........ 400/320 |

OTHER PUBLICATIONS

IBM Technical Disclosure Bulletin vol. 24, No. 1A, Jun. 1981.
IBM Technical Disclosure Bulletin, vol. 24, No. 7B Dec. 1981, Drive Idler System, S. W. Johnson and C. W. Knappenberger, pp. 3748, 3749, 3750.

Primary Examiner—Clifford D. Crowder
Assistant Examiner—Ren Yan
Attorney, Agent, or Firm—Gary D. Clapp; John S. Solakian

[57] ABSTRACT

Belt tensioning apparatus for a serial printer wherein a spring imparts a predetermined pull to driving belt by applying a predetermined force to a slide on which a belt return idle pulley is mounted, and wherein a slide is offset from a working point and in the direction opposite to the force exerted by the spring by an amount controlled by a stop pad, preferably resilient and position adjustable, or automatically changeable in position owing to belt elongations occurring during operation.

6 Claims, 2 Drawing Sheets

BELT TENSIONING MEANS FOR A SERIAL PRINTER

The present invention relates to a belt tensioning means for a serial printer.

It is known that in serial printers a carriage, mounted on guiding bars, reciprocates along a printing line owing to motor means acting on the carriage through a driving cable or belt.

The motor is usually mounted on a side of a frame of the printer and operates a driving pulley which transfers its movement to a driving belt which is stretched between the driving pulley and a return pulley. The carriage is fixed at a suitable point of the belt.

In order to assure a correct operation of the driving mechanism and ultimately good printing quality it is necessary to apply a suitable tension to the belt.

The tension must not be excessive, to avoid wearing and damaging of the pulleys and motor bearings, nor it must be too low, to avoid the generation of oscillatory phoenomena, jerking movement and ultimately an anomalous operation.

Two approaches are followed for controlling belt tension.

In a first approach, the belt is tensioned by a suitable relative positioning of the motor and the return idle pulley, so as to establish the desired belt tension. The motor and/or idle pulley are then clamped in position by means of clamping screws. In positioning the motor and/or the idle pulley, springs or other devices may be used which provide the desired tension, for example, as disclosed in U.S. Pat. No. 4,395,151.

In a second approach, the idle pulley is mounted on a slide which is movable relative to the driving pulley, and a spring acts to pull the slide away from the driving pulley so as to impose the desired tension to the belt.

Both approaches have advantages and draw backs.

The first approach minimizes the carriage offset relative to the nominal position imposed by the motor, but in the dynamic state is more sensitive to mechanical resonance phoenomena which cause a jerking motion of the carriage.

The second approach avoids the resonance problems, but owing to the elastic yielding of the idle pulley constraint under dynamic conditions, causes an offset in the relative position of the carriage and ultimately a bad printing quality.

These disadvantages are overcome by the belt tensioning means for a serial printer of the present invention, which cumulates the advantages of the two approaches.

Under static conditions, the tension means of the invention assures a predetermined tension to the belt and provides a steady constraint for the pulling action exerted by the belt, which exceeds the imparted tension and tends to bring the idle pulley near the driving pulley. On the occurrence of dynamic conditions which tend to reduce the tension, the device operates as a free elastic constraint which maintains the predetermined tension.

These results are achieved by mounting the idle pulley on a movable slide support and by using an elastic means which, acting on the support in one direction, provides the belt tension, and, in the opposite direction, a relatively non-elastic stopping means which prevents or minimizes the slide displacement and exerts a force which cumulates with the one exerted by the elastic means.

The features and the advantages of the invention will appear more clearly from the following description of a preferred form of invention and some variants thereof and from the enclosed drawings where:

Figure 1:
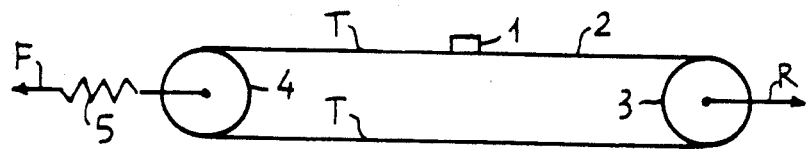
FIGS. 1,2,3 show in schematic form the phoenomena which develop in belt tensioning devices of the conventional type with elastic stretching.

FIG. 1 shows the rest state of a conventional driving mechanism for the carriage of a serial printer. Carriage 1 is fastened to a belt 2 (generally a toothed belt). Belt 2 is wound on a driving pulley 3 and an idle return pulley 4. Idle pulley 4 is pulled towards the left side of FIG. 4 by a spring 5. Spring 5 exerts a pull F, which for small displacements of pulley 4 may be considered constant. The exerted pull is in the order of 3 kg.

In static conditions or in conditions of uniform carriage motion, with the assumption that friction forces are negligible, the driving torque exerted by driving pulley 3 is null; the constraint reaction R exerted on driving pulley 3 is equal and opposite to F (3 Kg) and belt 2 is subjected to a uniform tension CTS where $T=F/2=1,5$ kg.

Figure 2:
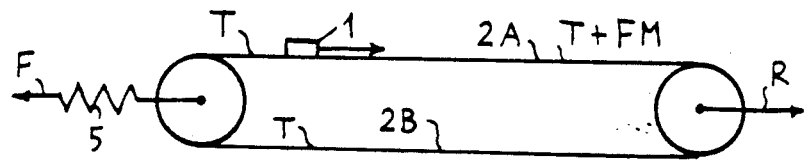

FIG. 2 shows the situation which occurs when carriage 1 is accelerated towards the right side of FIG. 2, for instance in order to start the printing of a line. Carriage 1 may typically have a weight in the order of 300/500 grams is subjected to accelerations in the order of 10 g. The driving pull FM exerted on carriage 1, must therefore be in the order of 3/5 kg in order to impart such an acceleration.

While belt portion 2B, between carriage 1, idle pulley 4 and driving pulley 3, is always subjected to a tension of $T=1.5$ kg, the belt portion 2A, between carriage 1 and driving pulley 3 is subjected to a tension equal to $T+FM$.

The resulting elongation of belt 2 is recovered by the constraining displacement of idle pulley 4 caused by spring 5.

Figure 3:
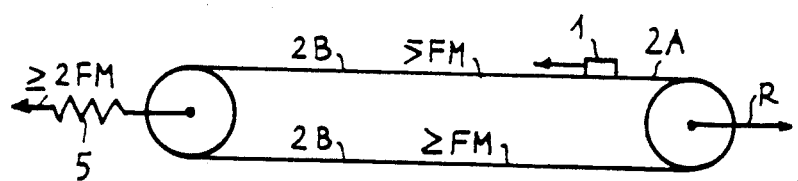

FIG. 3 shows the situation which occurs when carriage 1 is accelerated towards the left of FIG. 3. In this case the whole portion 2B of the belt 2 is subjected to a pull not lesser than FM. The elastic constraint imposed by spring 5, acting on idle pulley 4, must yield up to a point at which the force exerted by spring 5 equals two times the pull.

As a consequence a corresponding yield in the position of idle pulley 4 occurs and results in a carriage 1 offset relative to nominal position carriage 1 would have taken owing to driving pulley 3 rotation. The offset equals two times the yield of the constraint, that is, of idle pulley 4 and spring 5, plus the elongation of belt 2. This offset is prejudicial to the printing quality.

Even if the elongation of belt 2 causes a limited offset which might be tolerated, the offset caused by the yield in the constraint imposed by idle pulley 4 and spring 5, which is much greater, is unacceptable.

Figure 4:
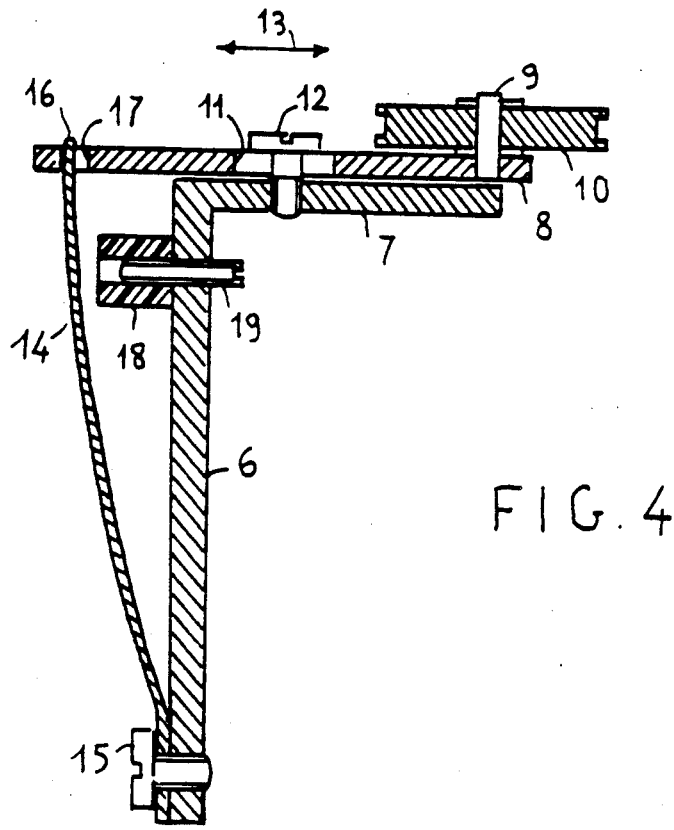
FIG. 4 is a sectional view of a preferred embodiment of the belt tensioning means according to the invention.

FIG. 4 is a section view of a preferred form of embodiment for a belt tensioning means which overcomes this inconvenience.

In FIG. 4, a side plate 6 of the printer is provided with a supporting wing 7 for a movable slide 8 having the form of an elongated bar.

A post 9 is fixed at one end of slide 8 and acts as a journal for an idle pulley 10.

Slide 8 has at least one slot 11, elongated in the direction of slide 8. A retaining and guiding post 12, is inserted into the slot 11 and is screwed into the supporting wing 7, so that slide 8 can move with a suitable excursion in the direction indicated by arrows 13.

A leaf spring 14, fixed to side plate 6 by a screw 15 or other equivalent means, has a free end 16 inserted in an opening 17 in the slide 8 end opposite to the end where idle pulley 10 is mounted.

Spring 14 is sized in order to exert a pull on slide 8 hence a return force on idle pulley 10 towards the left side of FIG. 4 of the order of 3 kg for the whole permitted stroke of slide 8. This return force is balanced by the tensioning of the belt 2. Thus the spring 14 and slide 8 form first means for providing a predetermined return force to the idle pulley.

A rubber pad 18 having a central opening is fixed to side plate 6 between plate 6 and spring 14 by means of a pin 19 screwed into side plate 6 and inserted in the central opening of pad 18.

Pad 18 is of a thickness suitable to and defined by the following described operation and defines a working point for spring 14, around which point the response of the device is entirely different.

Figure 5:
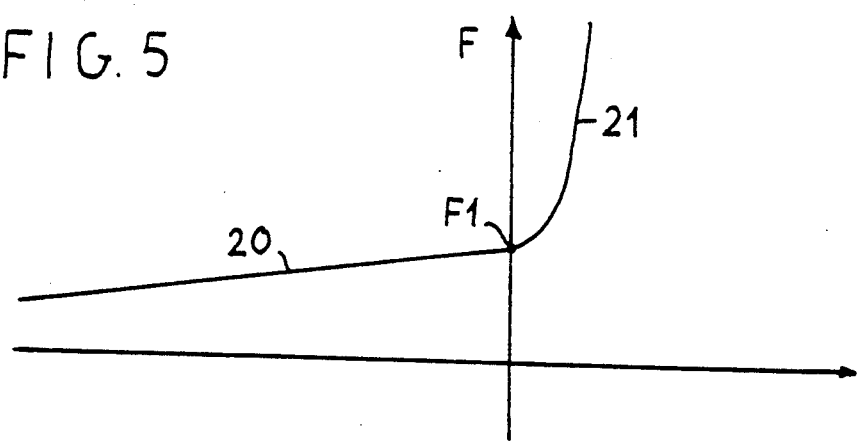
FIG. 5 shows a diagram of the qualitative relationships between reactions developed by the device of FIG. 4 and offsets relative to a predetermined working point.

The diagram of FIG. 5 shows such response, wherein left and right offsets from the working point are shown on the abscissa, and the pull exerted by spring 14 on the slide is shown on the ordinate.

When spring 14 is in contact with pad 18, without compressing pad 18, the force exerted on the slide 8 is F1, for instance in the order of 3 kg. The working point may be chosen so as to correspond to a normal rest pull on belt 2, which is wound on pulley 10, and may be selected by adjusting the position of driving pulley 3.

If, owing to dynamic effects such as those described with reference to FIG. 2, an elongation of belt 2 occurs without increase in the pull exerted by belt 2 on idle pulley 10, spring 14 moves slide 8 towards the left side of FIG. 4 and assures a pull which, depending on the offset from the working point, changes according to diagram 20 of FIG. 5.

The slope of diagram 20 is defined by the elastic constant of spring 14.

If, owing to dynamic phoenomena such as those described with reference to FIG. 3, the pull exerted by belt 2 on pulley 10 increases, slide 8 is pulled towards the right side of FIG. 4 and spring 14 tends to compress pad 18. Pad 18 exerts an increasing resisting action, with an elastic constant which is variable and at all times much greater than the elastic constant of spring 14.

Diagram 21 of FIG. 5 shows the relation between offsets and the forces exerted by pad 18. These forces are transferred to slide 8 through spring 14. It is clear that even if the pull exerted by driving belt 2 is greatly increased, the yield of the constraint provided by pad 18 is a minimum. It is further clear that any yield beyond a predetermined limit may be virtually eliminated by providing a rigid stop for the movement of leaf spring 14 towards right. This stop may be provided by pin 19, whose position may be suitably adjusted. The function of the rubber pad 18 is therefore to establish a limited working range within which the elastic constant of the device gradually increases, without discontinuities. The resilient characteristic of pad 18 also provides an efficacious damping of vibrations and resonance phoenomena. Thus the rubber pad 18 and the pin 19 form second means for providing an additional return force to the idle pulley 10, the additional force increasing with small displacements of the pulley from the working point, in the direction opposite to the one of the return force.

The device of FIG. 4 is only a preferred embodiment by reason of its simplicity.

It is clear that several changes can be made.

For instance, rather than defining the working point by adjusting the position of driving pulley 3, it is possible to select the working point by providing pin 19 with a rest plate for pad 18.

In this case pad 18, rather than resting on side plate 6, rests on a surface whose position is variable and may be adjusted by screwing pin 19 into and out of side plate 6.

Figure 6:
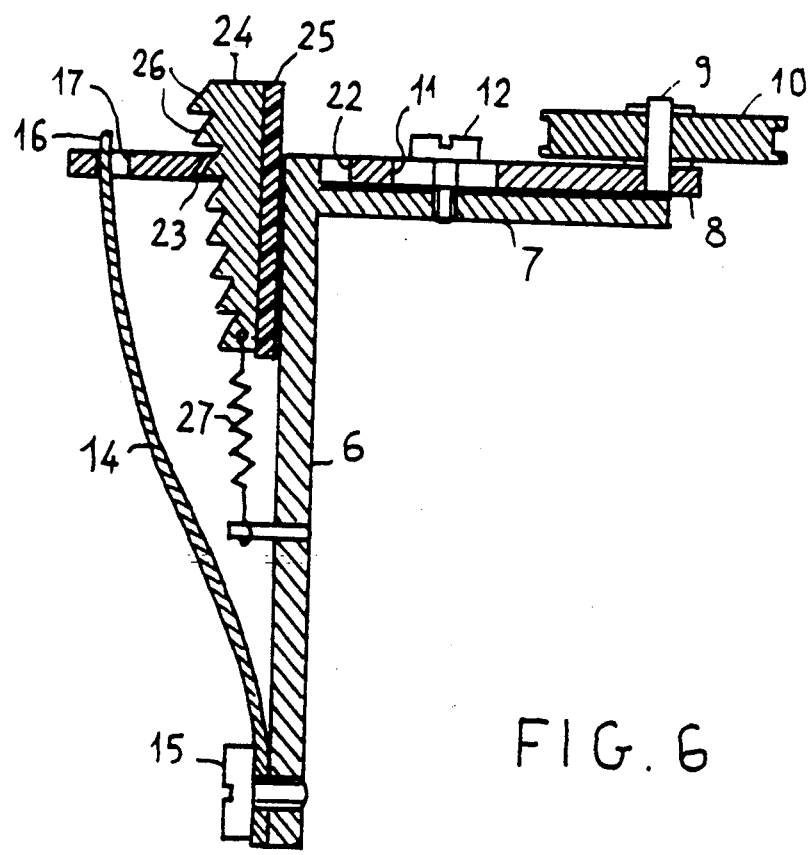
FIG. 6 is a variant of the device of FIG. 4.

FIG. 6 shows a more elaborate embodiment where the working point is adjusted automatically and possible elongation of belt 2 occurring during the printer life can be recovered.

In FIG. 6, slide 8 has, in addition to slot 11 for slidable mounting slide 8 on support 7 and in addition to opening 17 for insertion of the end of leaf spring 14, a further slot 22, wherein slot 22 has, at the edge closer to opening 17, a saw tooth 23. A wedge 24 is inserted into slot 22, between saw tooth 23 and side plate 6 and has a flat surface resting on side plate 6 while the opposed of wedge 24 face is toothed.

A rubber pad 25 is fixed, by gluing or other means on the flat surface of wedge 24.

The teeth 26 of the toothed face of wedge 24 define a plurality of grooves or indentations having a variable distance from pad 25 and tooth 23 is inserted in one of such indentations.

The lower thinner portion of the wedge 24 is pulled downward by a spring 27, anchored to side plate 6, so that tooth 23 acts as a pawl for wedge 24. A certain allowance exists between tooth 23 and the bottom of the groove of wedge 24's toothed face where tooth 23 is inserted.

It is clear that, in static conditions, wedge 24 will move downward to the extent permitted by the pull imposed to belt 2 by spring 14.

In dynamic conditions, as those shown in FIG. 2, the elongation of belt 2 causes a displacement of slide 8 and tooth 23 towards the left owing to spring 14. As a consequence, wedge 24 moves downward until interference is established between teeth 26 and tooth 23.

When static conditions have been reestablished, and belt 2 elongation is recovered, tooth 23 is more deeply inserted in one of wedge 24's grooves.

By a suitable sizing of the height of teeth 26, preferably equal to half the maximum allowed elongation of belt 2, it can be obtained that tooth 23 will be completely inserted into one of the indentations defined by teeth 26, without the possibility of slide 8 yielding towards the right except as permitted by the yield of rubber pad 25.

In this way, belt 2 tension may be automatically selected, as well as the working point, independently of differences in belt 2's length or manufacturing tolerances of the driving mechanism. Further, if belt 2 tends to stretch or slide 8 to shift either over time or during a dynamic situation such as illustrated FIG. 2, wedge 24 will move downwards further and restore the relative position of the carriage.

The embodiment of FIG. 6 is a preferred one only and several changes can be made to it. For instance, wedge 24 may be integrally made of rubber, so that the hysteresis function performed by toothing 26 in combination with tooth 23 may be performed by wedge 24 itself, which would be suitably prestressed in the static condition.

What is claimed is:

1. A belt tensioning means for a serial printer in which a spring imposes a continuous predetermined tension to a drive belt by applying a first continuous predetermined elastic return force to an idle pulley in a first direction to maintain said tension imposed to said drive belt, said pulley and said first return force being set at a working point when said belt is unaffected by elongations and belt tension increases caused by dynamic effects, said pulley being displaceable from said working point due to elongations and belt tensions increases caused by said dynamic effects, said tensioning means comprising:
   a first means comprising said spring for providing said first continuous predetermined elastic return force in said first direction to maintain said tension imposed to said drive belt when said pulley is displaced in said first direction by said dynamic effects and when said pulley is displaced in a second direction opposite to said first direction by said dynamic effects, and
   a second means for providing an additional second elastic return force to said pulley, said second return force being continuously applied to said pulley in said first direction when said pulley is displaced from working point in said second direction by said dynamic effects, said second return force being substantially zero when said pulley is at said working point and increasing with small displacements of said pulley from said working point in said second direction opposite to said first direction of said first predetermined return force.

2. The tensioning means of claim 1 where said second means comprises a resilient means.

3. The tensioning means of claim 2 further comprising an adjusting means for adjusting the position of said second means.

4. The tensioning means of claim 2 where said means is responsive to elongation of said belt occurring during operation of said printer to change its position as a function of the offset of said pulley from said working point and in said first direction of said first predetermined return force.

5. The tensioning means of claim 2 for a serial printer having a side plate where said first means comprises a slide supporting said idle pulley and slideably mounted on said printer side plate and a leaf spring mounted to said side plate and having a free end acting on said slide to continuously apply said first predetermined return force to said slide and said pulley in said first direction, and where said second means comprise a resilient pad mounted on said side plate and compressed by said first means to continuously apply said second return force in said first direction when said idle pulley is displaced from said working point in said second direction opposite to said first direction of said first predetermined return force.

6. A belt tensioning means for a serial printer having a side plate in which a spring imposes a continuous predetermined tension to a drive belt by applying a first continuous predetermined elastic return force to an idle pulley in a first direction to maintain said tension imposed to said drive belt, said pulley and said first return force being set at a working point when said belt is unaffected by elongations and belt tension increases caused by dynamic effects, said pulley being displaceable from said working point due to elongations and belt tensions increases caused by said dynamic effects, said tensioning means comprising:
   a first means comprising for providing said first continuous predetermined elastic return force in said first direction to maintain said tension imposed to said drive belt when said pulley is displaced in said first direction by said dynamic effects and when said pulley is displaced in a second direction opposite to said first direction by said dynamic effects,
   said first means comprising a slide supporting said idle pulley and slideably mounted on said printer side plate and a leaf spring mounted to said side plate and having a free end acting on said slide to continuously apply said first predetermined return force to said slide and said pulley in said first direction, and
   a second means for providing an additional second elastic return force to said pulley, said second return force being continuously applied to said pulley in said first direction when said pulley is displaced from working point in said second direction by said dynamic effects, said second return force being substantially zero when said pulley is at said working point and increasing with small displacements of said pulley from said working point in said second direction opposite to said first direction of said first predetermined return force,
   second means comprising a resilient pad mounted on said side plate and compressed by said first means to continuously apply said second return force in said first direction when said idle pulley is displaced from said working point in said second direction opposite to said first direction of said first predetermined return force.

* * * * *

UNITED STATES PATENT AND TRADEMARK OFFICE
CERTIFICATE OF CORRECTION

PATENT NO.   :   4,991,984
DATED        :   February 12, 1991
INVENTOR(S)  :   Carlo Fare'

It is certified that error appears in the above-identified patent and that said Letters Patent is hereby corrected as shown below:

For the Assignee, line 73, change "Bull HN Information Systems Inc., Billerica, Mass. to --Bull HN Information Systems Italia S.p.A., Caluso, Italy--

Signed and Sealed this

First Day of September, 1992

Attest:

*Attesting Officer*

DOUGLAS B. COMER

*Acting Commissioner of Patents and Trademarks*